US 8,781,326 B2

(12) United States Patent
Hu et al.

(10) Patent No.: US 8,781,326 B2
(45) Date of Patent: Jul. 15, 2014

(54) ENERGY EFFICIENT OFDM TRANSCEIVER

(75) Inventors: Junqiang Hu, Davis, CA (US); Dayou Qian, Princeton, NJ (US); Ting Wang, W. Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 61 days.

(21) Appl. No.: 13/437,139

(22) Filed: Apr. 2, 2012

(65) Prior Publication Data

US 2012/0257897 A1    Oct. 11, 2012

Related U.S. Application Data

(60) Provisional application No. 61/743,959, filed on Apr. 11, 2011.

(51) Int. Cl.
| | |
|---|---|
| *H04B 14/00* | (2006.01) |
| *H04B 10/00* | (2013.01) |
| *H04B 10/548* | (2013.01) |
| *H04B 10/60* | (2013.01) |

(52) U.S. Cl.
CPC .............. *H04B 10/548* (2013.01); *H04B 10/60* (2013.01)
USPC ........................................... 398/76; 398/140

(58) Field of Classification Search
USPC .......................................................... 398/76
See application file for complete search history.

(56) References Cited

U.S. PATENT DOCUMENTS

| | | | | |
|---|---|---|---|---|
| 8,000,604 | B2 * | 8/2011 | Qian et al. | 398/89 |
| 8,498,534 | B2 * | 7/2013 | Hirth et al. | 398/25 |
| 2005/0250452 | A1 * | 11/2005 | Walton et al. | 455/63.4 |
| 2010/0310256 | A1 * | 12/2010 | Shpantzer et al. | 398/74 |
| 2012/0141130 | A1 * | 6/2012 | Nakashima et al. | 398/82 |

OTHER PUBLICATIONS

Luo, Fa-Long, Digital front-end in wireless communications and broadcasting: circuits and signal processing, 2011, Cambridge University Press, p. 540.*
Lenk, John D., Simplified Design of Data Converter, 1997, Butterworth-Heinemann, Section 3.4.*
Chiueh et al., OFDM Baseband Receiver Design for Wireless Communications, 2007, John Wiley & Sons, p. 26.*
de Silva, Clarence W., Mechatronics: An Integrated Approach, 2005, CRS Press, p. 320-321.*

* cited by examiner

*Primary Examiner* — Ken Venderpuye
*Assistant Examiner* — Jai Lee
(74) *Attorney, Agent, or Firm* — Joseph Kolodka

(57) ABSTRACT

An energy efficient OFDM transceiver includes a transmitter using a decision processor to control first internal elements that can be operated in parallel and can be selectively powered off or hibernated, and a receiver using a processing decision element to control second internal elements that can be operated in parallel and can be selectively powered off or hibernated, wherein control of the first and second internal elements enables tracking status of network traffic, adjustment of OFDM bandwidth based on a traffic decision and selectively powering off or hibernating parallel ones of the first and second internal elements.

18 Claims, 3 Drawing Sheets

US 8,781,326 B2

ENERGY EFFICIENT OFDM TRANSCEIVER

RELATED APPLICATION INFORMATION

This application claims priority to provisional application Ser. No. 61/473,959 filed on Apr. 11, 2011, the contents thereof are incorporated herein by reference.

BACKGROUND

The present invention relates to Orthogonal Frequency Division Multiplexing OFDM based optical communications, and, more particularly, to an energy efficient OFDM transceiver.

As the telecom industry is facing an exponential increase of network capacity, energy efficiency has become a growing concern. Statistical results show that periodic variations of the traffic volume in telecom networks are significant. Attention is directed to FIG. 1, depicting the daily traffic volume at an Amsterdam internet exchange. An energy-efficient network should be able to follow these variations. However, especially in the optical core network, all pieces of equipments required to carry the peak-traffic are powered on permanently, regardless of the capacity actually being transported.

Several Prior attempts to solve the problem from different aspects have failed to provide a satisfactory energy efficient technique. One attempt employed selectively turning off network elements. This solution turns off the optical link (and the corresponding line card) when traffic is low, and uses traffic re-routing to provide network connectivity. The drawback is that when the optical link is turned off, it will take long time to power it on and have it stabilized. This becomes critical issue in case of emergency, in which huge volume of traffic might happen when some links are powered off in low traffic period.

Another attempt was directed to an energy efficient network design. This attempt tried to solve the problem from the network architecture side, to minimize the power consumption of routers and optical components (e.g., EDFAs, transponders). The network elements still cannot track network. In a yet further attempt, energy efficient IP packet forwarding was employed to solve the problem from an internet protocol IP layer, for example, by using different packet size, or by using pipelined switching, Lastly, another attempt employs Green routing. This solution uses energy consumption of network elements as the optimization objective, and the energy-aware routing scheme considers.

The first solution considers from physical elements, but because of the aforementioned drawback, it is not likely to be taken by service providers. The remaining above solutions are from network architecture or higher-layer processing, which could only optimize the power consumption, not able to achieve the lowest possible level.

Accordingly, there is a need for an efficient OFDM transceiver that overcomes the shortcomings of prior techniques

SUMMARY

An energy efficient OFDM transceiver includes a transmitter using a decision processor to control first internal elements that can be operated in parallel and can be selectively powered off or hibernated, and a receiver using a processing decision element to control second internal elements that can be operated in parallel and can be selectively powered off or hibernated, wherein control of the first and second internal elements enables tracking status of network traffic, adjustment of OFDM bandwidth based on a traffic decision and selectively powering off or hibernating parallel ones of the first and second internal elements.

In a preferred embodiment, the second internal elements include an interleaved lower-speed analog-to-digital-converter (ADC) with a track-and-hold capability to provide a high sampling rate, $1-1/(2^n)$ ADCs and corresponding track-and-hold capabilities to be powered off or hibernated when bandwidth is adjusted to $1/(2^n)$ of full bandwidth or below. A tunable filter is applied before a signal enters said ADC to remove unused spectra. The second internal elements include an ADC that provides a constant rate and a resampler following the ADC changes an output rate according to bandwidth use. The first internal elements include at least one of an OFDM modulator and OFDM demodulator, the OFDM modulator and demodulator elements being alive can be proportional to a sampling rate that is rounded up, with the others of the internal elements being powered off or hibernated.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to OFDM as the transmission method, and the subcarriers in use are adaptive to the volume of traffic in that interface, or the modulation format which is further determined by channel quality. One or some dedicated subcarriers are used to notify the receiver of the bandwidth to be used in future transmission (for example, from the third OFDM frame). Based on this information, the receiver adjusts its internal components, either to power off (or hibernate) some more (if bandwidth decreases), or power on (or awake) corresponding elements (if bandwidth increases).

In receiver side, elements that might be powered off or hibernated include digitizer module (analog to digital converter, ADC) and FFT (Fast Fourier Transform) blocks. In high speed application, the digitizer usually contains several interleaved lower-speed ADCs. When bandwidth in use is reduced, the overall sampling rate can be decreased, which means some lower-rate ADCs might be put in power saving mode (powered off or hibernated). For desired throughput, the receiver usually has multiple OFDM demodulation blocks working in parallel, and the total processing capacity of these parallel blocks matches the overall ADC sampling rate. When some ADCs turn inactive, the samples rate to be processed goes lower, so some OFDM demodulation modules can be in power saving mode as well.

The energy adaptation is also achieved from transmitter. Like the parallel processing in receiver side, transmitter also contains multiple OFDM modulators to work in parallel. When output bandwidth is decreased, the output sampling rate can be reduced, some OFDM modulators might be in power saving mode and the remaining active modulator modules still provide enough capacity. Because the output signals sampling rate is reduced, if DAC (Digital to Analog Converter) is still working at full clock rate, in one embodiment, output signals can be extended to multiple DAC output clock cycles, or output zeros for the other DAC output clock cycles. In one embodiment, the DAC clock frequency is reduced accordingly to match the samples rate of OFDM modulators. In case output sampling rate is decreased, either by reducing DAC clock frequency or extending OFDM modulator output sample period or outputting zeros between valid samples, a corresponding analog filter can be applied to remove harmonic spectra.

Figure 1:
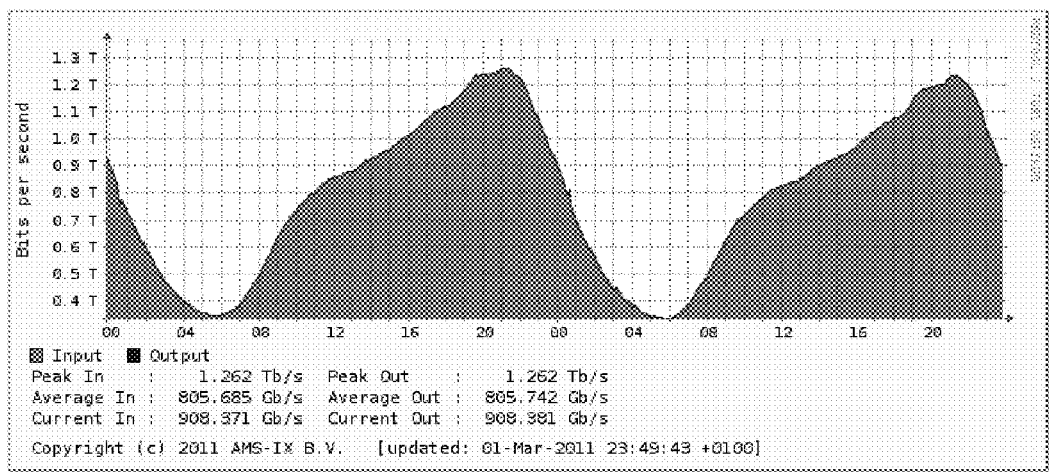
FIG. 1 is a diagram of daily traffic volume at an Amsterdam internet exchange.
Figure 2:
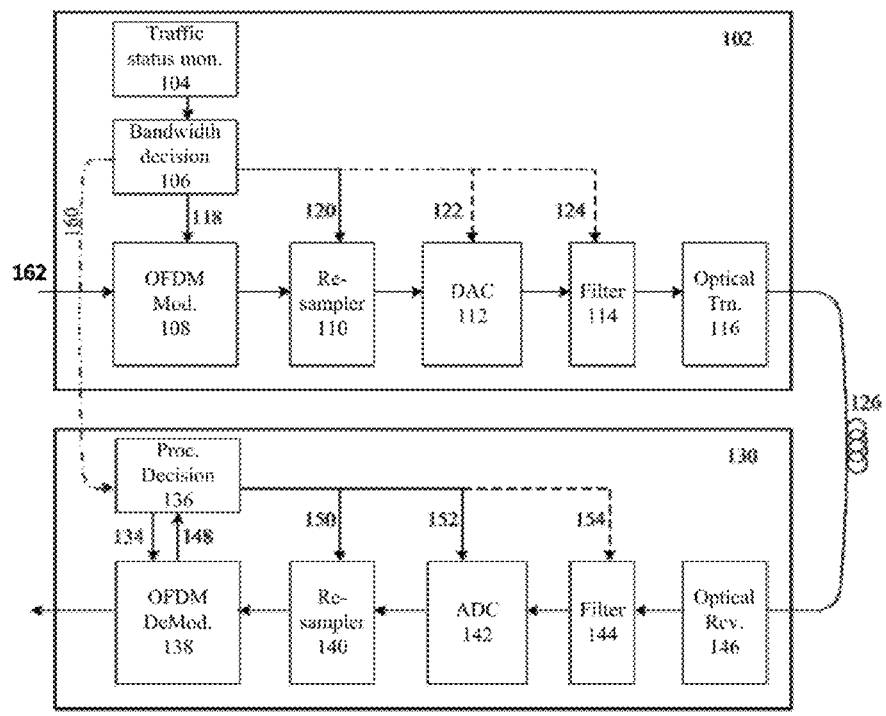
FIG. 2 is an overall block diagram of an energy OFDM transceiver, in accordance with the invention.

Referring now in detail to the figures in which like numerals represent the same or similar elements and initially to FIG. 2, which shows an overall block diagram of a system employing the invention.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

When the receiver is initially started, it samples with maximum sampling rate and demodulates using maximum FFT size, so that even when transmitter is using lower sampling rate and bandwidth, the receiver is still able to obtain the information carried by $F_d$, to further track the sampling rate and bandwidth given by the transmitter and sample/demodulate accordingly. Then the receiver will be synchronized (in terms of bandwidth usage configuration) with transmitter side to perform energy savings.

1.1 About OFDM

OFDM is digital multi-carrier modulation method, using a large number of closely-spaced orthogonal subcarriers to carry data. Each subcarrier can be individually modulated, and the modulation format can be flexibly selected.

OFDM has the advantage from the following aspects:
1) Each sub-carrier can be individually modulated and the modulation format can be flexibly selected; sub-carriers can be dynamically allocated based on transmission or network requirement
2) Flexible modulation format selection, so when signal quality goes lower, the system may use larger bandwidth with lower modulation format; while in case signal quality is higher, the system may change to lower bandwidth with higher modulation format
3) Multi-path (or channel fading) tolerance, which can help to eliminate CD compensation in optical communications With these advantages, and also with the development of high-speed converters (including digital-to-analog converter or DAC, and analog-to-digital converter or ADC), OFDM is believed to be a good candidate in wide area of optical communications, from access network (such as passive optical network) to long haul transmission (such as 40G or 100G transmission link).

1.2 OFDM Transmitter and Receiver

A typical OFDM transmitter includes OFDM modulator, digital resampler, digital-to-analog converter (DAC), and optionally an analog filter. OFDM modulator further includes symbol mapping module, to convert from binary bit stream to certain symbols such as QPSK or 16QAM; and IFFT (inverse Fast Fourier Transform) module, to convert frequency domain signal to time domain for transmission. Digital resampler changes sampling rate to adapt the speed of DAC. The most popular case is to interpolate the IFFT output samples to higher sampling rate, by inserting zeros between the samples and then applying low pass filter. DAC converts signal from digital to analog domain for transmission.

OFDM receiver performs the reverse operation of an OFDM transmitter, which includes: optional analog filter, analog to digital converter (ADC), resampler, and OFDM demodulator. Similarly, the resampler changes the ADC input sampling rate to adapt the needs of OFDM demodulator; OFDM demodulator applies FFT to convert signals to frequency domain, performs equalization, and then de-maps the symbols to binary sequence.

1.3 High-speed ADC

In optical communication, the required digitizing rate is usually higher than a single ADC element can handle. So the most popular solution is applying power splitter to input signals, and further inputting to multiple sub-ADC channels. These sub-ADC channels sample the signal in interleaving mode, so that when the output from these sub-ADCs are combined, they will provide time-equally sampled signal with rate of N×S where N is the number of sub-ADCs and S is the sampling rate of each sub-ADC.

2. Energy Efficient Solution

For better explanation, the following uses term "OFDM block" for the symbols generated from one IFFT and after adding cyclic prefix (when necessary).

The main embodiment of the present invention is for a line interface using OFDM as the modulation format, providing maximum transmission capacity C, under the case of M-point FFT and sampling rate S; in case lower bandwidth is needed, either because of lower traffic load or higher modulation format to be used (because of better channel quality), system capacity is reduced to (roughly) $C/2^n$ (n=1, 2, ... ), by using ($M/2^n$)-point FFT and sampling rate of $S/2^n$. When sampling rate is reduced, for both transmitter and receiver, some of the parallel processing modules might be eligible to be powered off or hibernated, while still provide enough processing capacity. The decision for the number of subcarriers to be used is based on traffic load.

2.1 OFDM Configuration and Subcarrier Allocation

The present invention uses constant base subcarrier frequency and fixed duration for each OFDM block. When the system changes to lower bandwidth, it always uses lower frequency subcarriers and frees those of higher frequencies. The transmitter makes decision on the subcarriers to be used from the next D-$^{th}$ OFDM block, where D is determined by receiver reaction time (such as the power on or awaken time for all the functional modules), and sends this information to the receiver. One or several dedicated subcarriers $F_d$ is pre-defined to carry such information. $F_d$ is located within the lowest bandwidth range, to guarantee that it always exists and is transmitted to the receiver. Multiple OFDM blocks may be framed to carry such configuration and other control information; FEC (Forward Error Correction) field can be applied to the frame for better tolerance, or CRC (Cyclic Redundancy Check) can be used to check for the correctness.

2.2 Transceiver Block Diagram and Processing Procedure

FIG. 2 is the block diagram for an exemplary embodiment of the present invention. Transmitter 102 takes input 162 from prior processing and first uses OFDM modulator 108 to generate OFDM signal in digital domain. OFDM modulator 108 is under the control of bandwidth decision module 106, which uses the input from traffic status monitor 104. Based on the traffic information, block 106 decides the bandwidth needed, and further determines the sampling rate and FFT size. Such decision is input to OFDM modulator 108 through signal 118. Block 108 follows this decision to modulate the input signal. This information is also framed with other management information, or with data to be transmitted, and modulated by 108 to dedicated subcarrier(s) (say subcarrier(s) $F_d$), to notify the receiver about future bandwidth and sampling rate in use. $F_d$ can be any subcarrier within the minimum bandwidth $B_m$.

In an exemplary embodiment, the information carried by $F_d$ spans several OFDM blocks and is encapsulated using certain framing scheme. Following OFDM modulator 108 includes an optional resampler 110 to adapt the sampling rate to DAC 112, which converts discrete signal (in digital domain) to continuous (analog domain). Filter 114 is to remove the high-frequency aliases caused by DAC 112. The Optical transmitter 116 converts the signal from electrical to optical and ready for transmission through link 126. Optionally block 110, 112, and/or 114 are also controlled by block 106 over respective signal links 120, 122, 124, to adjust resampling rate, or DAC clock rate, or selects the corresponding filter bandwidth.

In the receiver side (module 130), the optical receiver 146 first converts the input signal from optical domain to electrical, followed by optional low pass filter 144 to remove high frequency noise. ADC 142 digitizes the continuous signal to discrete for digital processing. An optional resampler 140 matches the sampling rate difference between that needed by OFDM demodulator 138 and ADC 142. OFDM demodulator 138 processes the sampled signal and recovers the original information. The information in subcarrier $F_d$ which contains bandwidth usage information is passed to processing decision block 136 through signal 148, to further configure the related blocks including: bandwidth of filter 144, sampling rate of ADC 142, resampling rate of resampler 140, and FFT size etc. used in OFDM demodulator 138. The processing decision block 136 communicated back with the OFDM demodulator 137 through signal link 148. The Processing decision block also can communicate with the resampler 140, ADC 142 and filter 144 through respective signal links 150, 152 and 154.

When the receiver is initially started, it samples with maximum sampling rate and demodulates using maximum FFT size, so that even when transmitter is using lower sampling rate and bandwidth, the receiver is still able to obtain the information carried by $F_d$, to further track the sampling rate and bandwidth given by the transmitter and sample/demodulate accordingly. Then the receiver will be synchronized (in terms of bandwidth usage configuration) with transmitter side to perform energy savings.

2.3 OFDM Receiver Operation for Energy Savings

The aforementioned energy savings can be achieved from three modules as in FIG. 2: partially powering off/hibernating the ADCs; powering off/hibernating some of the resampler modules, and/or changing re-sampling rate; powering off/hibernating some of the OFDM demodulator modules. These actions are configured by processing decision module 136, which decodes the control information carried in fixed subcarrier.

a. ADCs in Power Saving Mode

Figure 3:
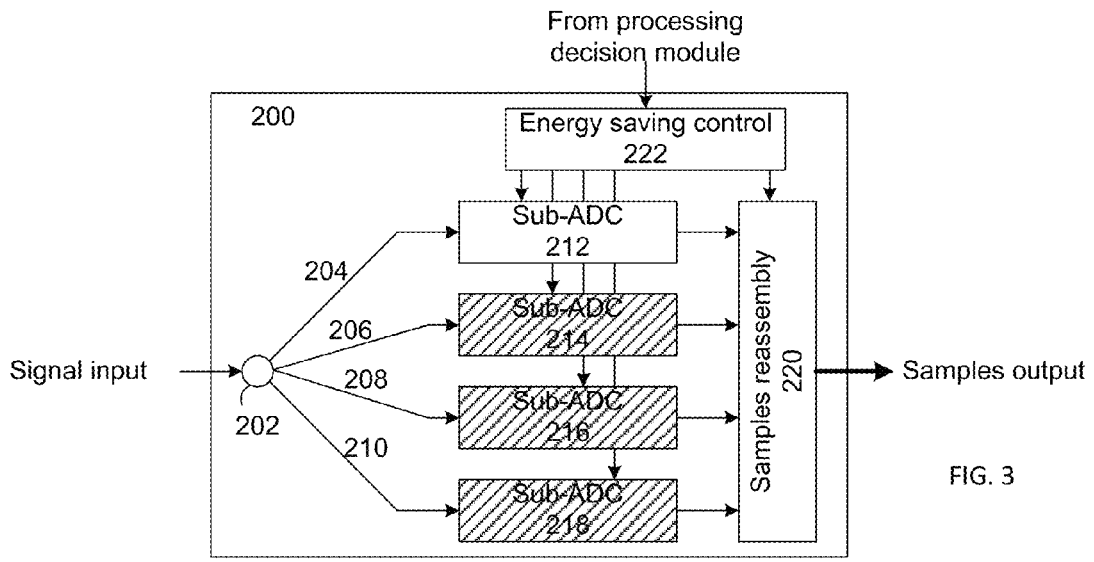
FIG. 3 is a diagram of digitizer and its internal configuration, in accordance with the invention.
Figure 4:
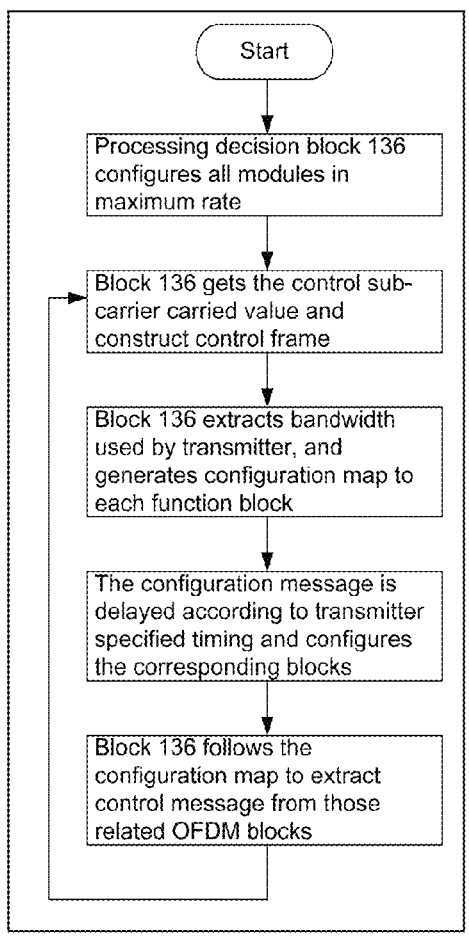
FIG. 4 is a diagram of receiver side processing of the energy efficient OFDM transceiver, in accordance with the invention.

When the digitizer consists of multiple interleaved ADC channels, the sampling rate can be changed by powering off or hibernating ($1-\tfrac{1}{2}\hat{}n$) of the total interleaved channels, where $\tfrac{1}{2}\hat{}n$ gives the portion of bandwidth to be used. For example, if the input signal reduces to ¼ of full bandwidth, the sampling rate can be ¼ of full-rate accordingly, which means ($1-¼$)=¾ of the interleaved ADC channels can be powered off or hibernated. This example is further illustrated in FIG. 3. Digitizer 200 includes 4 sub-ADCs, numbered from 212 to 218; energy saving control block 222, and samples reassembly block 220. Signal input is first replicated by power splitter 202 to 4 instances, numbered from 204~210, each feeding one sub-ADC, such as signal 204 feeds sub-ADC 212. These sub-ADCs work in interleaved mode, for example 212 samples at time ($k*t_0+0$), 214 samples at time ($k*t_0+¼*t_0$), 216 samples at ($k*t_0+½*t_0$), and 218 samples at ($k*t_0+*t_0$), where $t_0$ is the sampling period of each sub-ADC. These sub-ADCs are controlled by energy saving control block 222, to stay in working mode or energy saving mode (powered off or hibernated). Block 222 further receives control information from processing decision module (block 136 in FIG. 2) to take action. In this illustration, sub-ADCs 214~218 are in power saving mode while 212 is working, so digitizer 212 provides ¼ of full sampling rate. The outputs from the sub-ADCs are organized by samples reassembly block 220, which selects the active sub-ADC(s) and outputs the samples in time order.

b. Handling of Resampler Module (If Present)

When ADC sampling rate is reduced, the samples to be processed in one frame period will be reduced accordingly. This may enable a single resampler module to process multiple blocks in one (maximum) block period, and some other resampler modules be put in energy saving mode. One problem to consider is the processing overhead for overlapping samples: usually this resampler module uses FIR (Finite Impulse Response) filter, which takes several clock cycles (when implemented in serial mode) to fill-up the filter taps before outputting valid samples. The processing of multiple (shorter) blocks in one (longest) block period will increase the overhead percentage, so certain speed up is needed to enable energy savings from resampler module.

The resampler module may also take responsibility when lower rate than ADC capability is preferred and low pass filter is needed to remove higher frequency noise. In such cases the resampler takes higher sampling rate than required and outputs only those needed by OFDM demodulator.

c. OFDM Demodulator

The main change in OFDM demodulator is the FFT size: when sampling rate changes to ½, the FFT size (and number of output samples in equalization and demapping modules) changes to ½ of previous as well. Accordingly, the processing time for one OFDM block will be shorter. Same as resampler module, some OFDM demodulators can be put in energy saving mode.

d. Receiver Operating Procedure Summary

The receiver operation is controlled by processing decision block 136, which takes demodulated information from OFDM demodulator 138. This procedure is summarized in FIG. 3.

2.4 OFDM Transmitter Operation for Energy Savings

Figure 5:
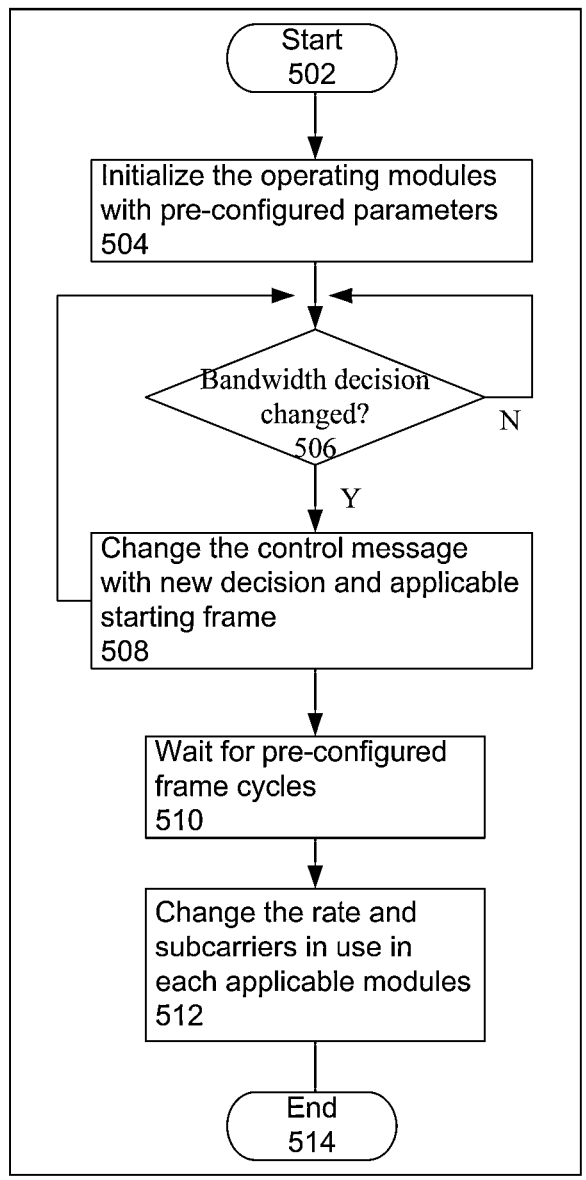
FIG. 5 is a diagram of transmitter operation of the energy efficient OFDM transceiver, in accordance with the invention.

The energy saving in transmitter side is also achieved from 3 different modules: OFDM modulator, resampler, and DAC. OFDM modulator operation is similar to demodulator in receiver side, in that it uses shorter IFFT size and outputs lower sampling rate when throughput is lower. In this case a single modulator can handle multiple (shorter) OFDM blocks in one (longest) OFDM block time, so some other OFDM modulator blocks can be put in energy saving mode. With reduced sampling rate output from OFDM modulator(s), if DAC clock rate can be adjusted to accept lower number of input samples, the resampler module 110 in FIG. 2 may also generates shorter samples for each OFDM block. This enables some of the resampler modules to be put in energy saving mode the same way as in receiver side. By reducing the DAC clocking rate (if applicable), DAC power consumption will be reduced as well. The operation procedure is given in flow chart in FIG. 5.

2.5 Bandwidth Adjustment Triggering Schemes

As mentioned above, the bandwidth decision module 106 makes decision on the bandwidth to be used. This is further derived from output traffic monitoring result: if the recent average traffic is lower than bandwidth in use, reduce the transmitted signal bandwidth by half; if higher than bandwidth in use, double the transmitted signal bandwidth (if not in full bandwidth). Alternatively, traffic monitoring can be achieved by monitoring the queue status: if the traffic in queue is lower than configured threshold (say threshold1), reduce the bandwidth by half (unless it is already the lowest); if the traffic in queue is higher than another threshold (say threshold2), double the bandwidth. This queue can be in egress port, or by certain approach (for example, using maximum queue length) in ingress ports.

2.6 Some Other Embodiments

Note that when the system encounters better channel quality (based on the feedback from receiver), it may use higher modulation format, which is equivalent to increased maximum interface rate, which results in lower traffic to maximum-interface-rate percentage, so the above embodiments can be applied as well. To avoid confusion or complicated control procedure in receiver side, the system may always use the lowest modulation format (e.g., QPSK) for control information (in particular the bandwidth usage message).

The application of the present invention can be any optical interface that applies OFDM modulation, such as but not limited to, point-to-point metro or core optical interface, OFDM-based passive-optical-network (PON).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. An optical system employing an orthogonal frequency division multiplexing OFDM modulation, comprising:
    a transmitter using a decision processor to control first internal elements that can be operated in parallel and can be selectively powered off or hibernated; and
    a receiver using a processing decision element to control second internal elements that can be operated in parallel and can be selectively powered off or hibernated;
    wherein said control of said first and second internal elements enables tracking status of network traffic, adjustment of OFDM bandwidth based on a traffic decision and selectively powering off or hibernating parallel ones of said first and second internal elements;
    wherein said second internal elements comprise an interleaved lower-speed analog-to-digital-controller ADC with a track-and-hold capability to provide a high sampling rate, 1-1($2^n$) analog-to-digital-controllers ADCs and corresponding track-and-hold capabilities to be powered off or hibernated when bandwidth is adjusted to 1/($2^n$) of full bandwidth or below, where n is a selectable sampling rate factor.

2. The system of claim 1, wherein a tunable filter is applied before a signal enters said ADC to remove unused spectra.

3. The system of claim 1, wherein said second internal elements comprise an analog-to-digital-controller ADC that provides a constant rate and a resampler following said ADC changes an output rate according to bandwidth use.

4. The system of claim 1, wherein said first internal elements comprise at least one of an OFDM modulator and OFDM demodulator, said OFDM modulator and demodulator elements being alive can be proportional to a sampling rate that is rounded up, with the others of said internal elements being powered off or hibernated.

5. The system of claim 1, wherein said transmitter decides a bandwidth and subcarrier allocation.

6. The system of claim 5, wherein said bandwidth and subcarrier allocation is based on traffic throughput on an OFDM transmitter line card or based on queue status of source ports.

7. The system of claim 5, wherein said bandwidth and subcarrier allocation decided by said transmitter is carried over a dedicated subcarrier.

8. The system of claim 7, wherein said dedicated subcarrier is time shared with regular traffic.

9. The system of claim 5, wherein said decision by said transmitter for said bandwidth and subcarrier allocation is sent over multiple OFDM frames earlier than action is taken for providing time for modules with said internal elements awaking or powering on.

10. The system of claim 1, wherein said parallel elements of said transmitter include subsequent processing following an OFDM modulator output.

11. The system of claim 1, wherein a sampling rate change for said transmitter is achieved by extending a period of an OFDM symbol or outputting zeros for unused samples or changing a digital-to-analog-converter DAC clock rate or changing a resampling rate.

12. The system of claim 10, wherein one of a tunable filter and an equivalent to a tunable filter is applied to an output signal from a digital-to-analog converter DAC.

13. A method by an optical system employing an orthogonal frequency division multiplexing OFDM modulation, comprising the steps of:
    determining through a decision processor, by a transmitter, to control first internal elements that can be operated in parallel and can be selectively powered off or hibernated; and
    determining through a processing decision element, by a receiver, to control second internal elements that can be operated in parallel and can be selectively powered off or hibernated;
    wherein said control of said first and second internal elements enables tracking status of network traffic, adjustment of OFDM bandwidth based on a traffic decision and selectively powering off or hibernating parallel ones of said first and second internal elements;
    wherein said second internal elements comprises an interleaved lower-speed analog-to-digital-controller ADC with a track-and-hold capability for providing a high sampling rate, 1-1/(2^n) analog-to-digital-controllers ADCs and corresponding track-and-hold capabilities for being powered off or hibernated when bandwidth is adjusted to 1/(2^n) of full bandwidth or below, where n is a selectable sampling rate factor.

14. The method of claim 13, wherein a tunable filter is applied before a signal enters said ADC to remove unused spectra.

15. The method of claim 13, wherein said second internal elements comprise an analog-to-digital-controller ADC for providing a constant rate and a resampler following said ADC changes an output rate according to bandwidth use.

16. The method of claim 13, wherein said first internal elements comprise at least one of an OFDM modulator and OFDM demodulator, said OFDM modulator and demodulator elements being alive can be proportional to a sampling rate that is rounded up, with the others of said internal elements being powered off or hibernated.

17. The method of claim 13, wherein said parallel elements of said transmitter include subsequent processing following an OFDM modulator output.

18. The method of claim 13, wherein a sampling rate change for said transmitter is achieved by extending a period of an OFDM symbol or outputting zeros for unused samples or changing a digital-to-analog-converter DAC clock rate or changing a resampling rate.

* * * * *